Figure 1:
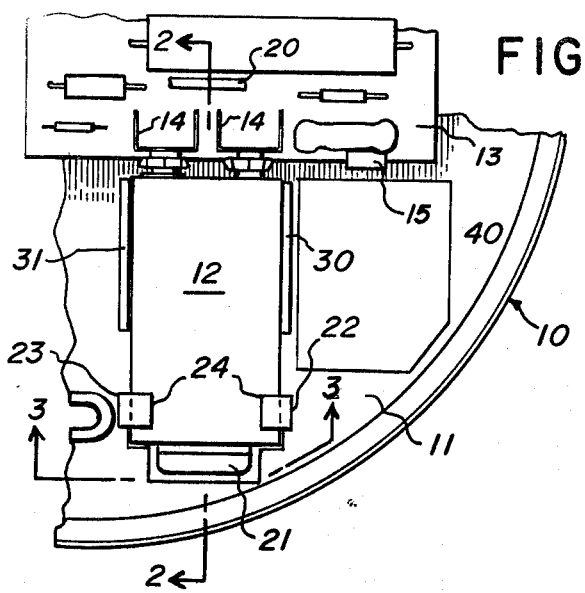

United States Patent [19]

Thompson

[11] 4,138,531

[45] Feb. 6, 1979

[54] BATTERY HOLDER FOR A CONTROL DEVICE

[75] Inventor: Maynard L. Thompson, Scott, Minn.

[73] Assignee: Honeywell, Inc., Minneapolis, Minn.

[21] Appl. No.: 864,189

[22] Filed: Dec. 27, 1977

[51] Int. Cl.² .............................................. H01M 2/10
[52] U.S. Cl. ........................................ 429/98; 429/100
[58] Field of Search .................................. 429/98, 100

[56] References Cited

U.S. PATENT DOCUMENTS

| 2,589,071 | 3/1952 | Galasso | 429/98 |
| 3,181,974 | 5/1965 | Barbera | 429/100 |
| 3,301,712 | 1/1967 | Bach | 429/100 |
| 4,031,295 | 6/1977 | Rigazio | 429/100 |

*Primary Examiner*—Donald L. Walton
*Attorney, Agent, or Firm*—Clyde C. Blinn; Henry L. Hanson

[57] ABSTRACT

A battery holder for a control device is integral with the base of the control device and has a first support member with battery connections and a second support member which is made up of a L-shaped lever comprising a portion of the base. The second support member is flexible whereby the battery can be placed between the first and second support members and a force moving the battery toward the connection means by the second support member will connect the battery to the connection. The battery can be removed from the battery holder by lifting the second support member. Adjacent support members which are hooked to hold the battery in place are flexible to move away from the battery when the battery is lifted to be in a position so that the battery can then be manually pulled out of the battery holder and disconnected from the battery connection means.

4 Claims, 6 Drawing Figures

U.S. Patent  Feb. 6, 1979  4,138,531

BATTERY HOLDER FOR A CONTROL DEVICE

BACKGROUND AND SUMMARY OF THE INVENTION

While most control devices which are battery operated have some means to hold the battery in place, with a smoke detector which is normally mounted on a ceiling of a room, the replacement of a battery can be difficult, time consuming and destructive to the control device if an unusual force is needed to pull or pry the battery from its connection to the associated electrical circuit.

The present invention recognizes that a battery must be rigidly connected to the connection means to provide the best possible electrical circuit connection which requires a considerable force to disconnect the battery and yet there is a need to provide for a connection means which can be easily operated to remove the battery. The present invention makes use of first and second stationary members which are part of the base of the control device so that a force can be applied to the members for connecting the battery and by manually moving on one of the members. The battery can be pivoted by the same member about the connection means to lift it into a position where the battery can be easily removed.

The invention is disclosed in the drawing of which

Figure 6:
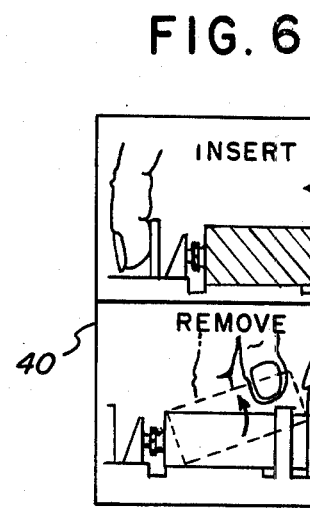
Figure 3:
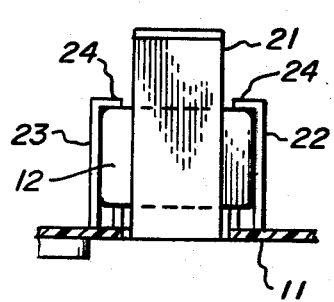
Figure 2:
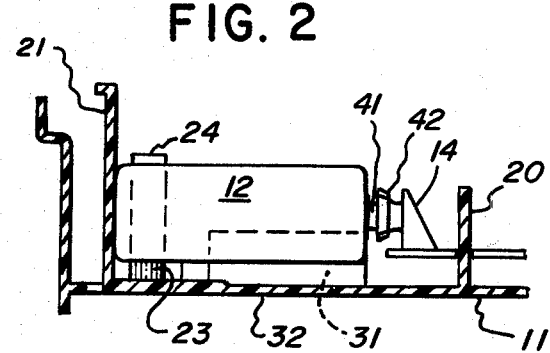
Figure 4:
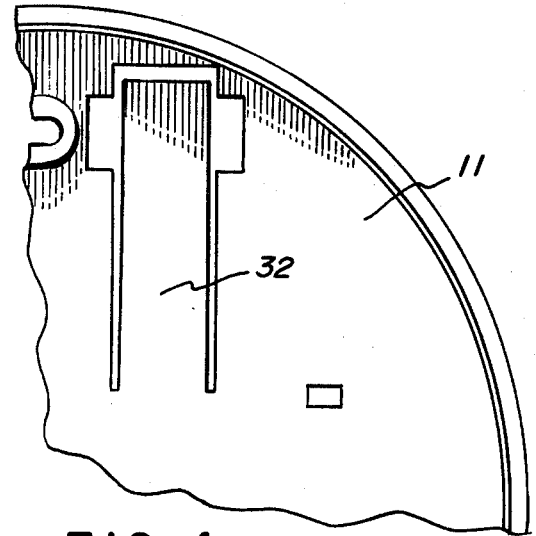
Figure 5:
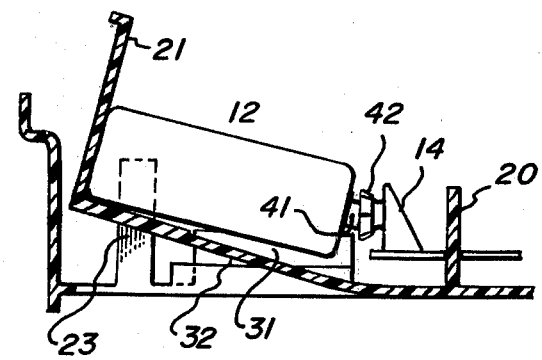

FIG. 1 is a partial cutaway view of a control device showing the battery holder, FIG. 2 is a side view of the battery in position, FIG. 3 is a back view of the battery in position, FIG. 4 is a back view of the control device showing the cantilever member which is a part of the base forming the stationary member for supporting the battery, FIG. 5 is a side view of the battery as mounted in FIG. 2 in a tilted position upon lifting the stationary member, and FIG. 6 is a schematic instructional diagram showing the insertion and removal of the battery into and from the battery holder.

DESCRIPTION OF THE INVENTION

Referring to FIG. 1, a control device such as a smoke or fire detector 10 has a base 11 which has a battery holder for holding a battery 12. The control device has a printed circuit board 13 which is attached to the base which is disclosed for showing the battery circuit connections 14 which are attached to the board 13. Board 13 is held on the base by conventional clip means such as that shown at 15. A stationary member 20 connected and projecting from the base 11 projects through board 13 to provide a rigid member for assisting in applying a force to the battery when being connected, as will be explained. A second stationary member 21 projecting from the base is flexible so that when the battery 12 is placed between member 21 and the battery connection terminals 14, a force can be applied to the backside of the battery by manually pinching members 20 and 21 together. A pair of adjacent support members 22 and 23 attached to and projecting from the base have a hook portion 24 on the outer extremity to provide for the support of the battery in a lateral direction parallel to the base an up and down direction away from the base. Members 22 and 23 are flexible so that when the battery is lifted they move away from the battery. Another pair of support members 30 and 31 are attached to and project away from the base on opposite sides of the battery to also support the battery from movement in a lateral direction parallel to the base.

Stationary member 21 as shown in FIG. 2 comprises a L-shaped cantilever member which has the long portion of the L 32 formed by cutting away a portion of the base as shown in FIG. 4. When an upward force is applied to member 21, the L-shaped support member can pivot in a cantilevered manner as shown in FIG. 5 to lift the battery and pivot it about its connection at terminal 14.

OPERATION OF THE INVENTION

As shown in the schematic diagram of FIG. 6 which might be an insert in a control device, battery 12 is inserted in place as shown in FIG. 2 so that the backside of the battery is against the stationary member 21 and the terminals of the battery are in line with the electrical connections 14 of the printed circuit board. A force is applied between members 21 and 20 by pinching the two members together. Since member 21 is flexible, the battery will be pushed to the right as shown in FIG. 2 to connect the electrical connections which are actually a snap terminal wherein a male portion 41 engages a female portion 42 or vice versa depending upon which is connected to the battery and to the circuit 14. In this type of battery connection, the members snap together to provide for a rigid connection which is somewhat difficult to remove.

To remove the battery 12, the stationary member 21 is lifted away from the base as shown in FIG. 5. The member cantilevers by bending portion 32 to pivot the battery with respect to the connections to break the electrical connection made up of the portions 41 and 42 whereby the battery can be lifted by hand by a continuation of the pivotal movement to remove the battery from the battery holder. Member 24 supports the battery when the battery is inserted into the battery holder and the vertical portions 22 and 23 position the battery before it is connected. Members 30 and 31 also provide for lateral support. Once the battery is pushed into position to connect the terminals 41 and 42, the support members 22, 23 and 31 have a relatively small function. When the stationary member 21 is lifted as shown in FIG. 5, members 22 and 23 spread apart due to the curved surface of the battery engaging portions 24 to allow the battery to be lifted out of the battery holder.

The embodiments of the invention in which an exclusive property or right is claimed are defined as follows:

1. A battery holder being an integral part of a base of a control device comprising,
   a base of a control device,
   a first stationary member attached to said base and projecting outward therefrom,
   a second stationary member attached to said base and projecting outward therefrom, said second member being flexible to allow for movement of said second member with respect to said first member, and
   battery connection means adapted to cooperate with at least one terminal on a battery, said connection means being attached to one of said members in between said first and second members whereby upon placing a battery between said members, a force applied to move said second member toward said first member connects the terminal of the battery to said connection means.

2. The invention of claim 1 wherein said second stationary member is a cantilever portion of the base of the control device forming an L shape with the leg of the L projecting outward from the base to be parallel with said first stationary member whereby the second stationary member is not only movable in a direction toward the first stationary member to provide the force for connecting the battery but said second stationary member is movable upward away from the base so that the main portion of the L-shaped cantilever member is adapted to be lifted in a direction away from the base when said second stationary member is pulled away from the base to provide for the pivoting of the battery with respect to the connection means so that the battery can be removed.

3. The invention of claim 2 comprising first and second support members attached to said base on each side of said second stationary member for supporting said battery in a lateral direction with respect to said first and second stationary members, said first and second support members being flexible and having hook shaped ends for lying over the battery when in position and movable away from said battery to release said battery when said battery is lifted by said second stationary member.

4. The invention of claim 3 comprising a third and fourth support member projecting from said base on each side of the battery to restrict the lateral movement of said battery between said third and fourth support members.

* * * * *